United States Patent
Day et al.

(10) Patent No.: US 7,500,140 B2
(45) Date of Patent: Mar. 3, 2009

(54) SYSTEM FOR ON DEMAND TASK OPTIMIZATION

(75) Inventors: Paul Reuben Day, Rochester, MN (US); Brian Robert Muras, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 532 days.

(21) Appl. No.: 11/013,270

(22) Filed: Dec. 15, 2004

(65) Prior Publication Data

US 2006/0143516 A1    Jun. 29, 2006

(51) Int. Cl.
*G06F 11/00* (2006.01)
(52) U.S. Cl. .......................................... 714/15
(58) Field of Classification Search .................. 714/15, 714/11, 13; 709/226, 229
See application file for complete search history.

(56) References Cited

U.S. PATENT DOCUMENTS

| | | | |
|---|---|---|---|
| 6,412,079 B1 * | 6/2002 | Edmonds et al. | 714/11 |
| 6,931,640 B2 * | 8/2005 | Asano et al. | 718/104 |
| 6,963,828 B1 * | 11/2005 | McDonald et al. | 703/22 |
| 7,035,919 B1 * | 4/2006 | Lee et al. | 709/223 |
| 7,050,961 B1 * | 5/2006 | Lee et al. | 703/22 |
| 2005/0125521 A1 * | 6/2005 | Grimm et al. | 709/223 |
| 2005/0235064 A1 * | 10/2005 | Barsness et al. | 709/229 |

* cited by examiner

*Primary Examiner*—Nadeem Iqbal
(74) *Attorney, Agent, or Firm*—Wood, Herron & Evans, LLP

(57) ABSTRACT

An apparatus, method and program product determines information indicative of a performance differential between operation of a computer with the standby resource activated and operation of the computer with the standby resource inactivated. The information is communicated to a user. The standby resource may be activated in response to the determination.

14 Claims, 3 Drawing Sheets

SYSTEM FOR ON DEMAND TASK OPTIMIZATION

FIELD OF THE INVENTION

The present invention relates to computing systems, and more particularly, to managing temporary resources within a data processing environment.

BACKGROUND OF THE INVENTION

Computer resource requirements for commercial and government applications often fluctuate over time. For instance, a business may experience periods of peak activity that exceed comparable processing or memory requirements of other periods. In another scenario, sales or employee growth may similarly burden existing computing resources with increased requirements. When faced with these increased resource demands, a user would conventionally have to purchase new hardware resources capable of accommodating the elevated computing needs. Such purchase requirements can represent a major, if not preclusive, expenditure for a user, who may have insufficient capital or time to react to rapid growth requirements.

To this end, computing architectures such as the "capacity on demand" design, developed by International Business Machines Corporation, allow customers to effectively "rent" resources such as processors on an as-needed basis. More particularly, a customer may temporarily enable on demand resources, or standby processors, which are initially dormant within their machine. Where desired, the standby processors are not included in the up front, baseline cost of the machine. As such, for a relatively smaller initial capital investment, a customer may be able to purchase a comparatively more powerful machine, and then activate and deactivate standby processors as needed for an additional fee, thus reducing the total cost of ownership for the machine.

Such selective utilization of standby processors provides customers with another layer of customized processor access and optimized usage. Conversely, capacity on demand systems supply system providers with a creative way to satisfy customer performance and cost requirements, while additionally providing an increased revenue source.

Despite the flexibility provided by the capacity on demand applications, some potential efficiencies, sales and other benefits may remain unrealized. For instance, standby resources may not be activated in time to address a specific need. By the time a user realizes that standby resources are needed for a particular project, it may be too late for those resources to be effectively utilized for the project. For example, in a database environment, a sizable query may run poorly before a user becomes aware that additional resources may need to be activated. The delay in activation can cause the resource activation to be too late to help with processing the query for which its activation was intended, and the activated resource may subsequently be underutilized. Improved mechanisms are consequently needed for managing resources within capacity on demand systems.

SUMMARY OF THE INVENTION

The present invention includes an improved system for managing resources within a computer system having a selectively activated standby resource. In one sense, the system informs a user, typically a system administrator, of potential efficiencies that may be realized by activating standby resources. The user may then elect to activate or have activated for them those standby resources in order to accomplish work.

More particularly, the system may output information indicative of a performance differential between operation of the computer system with the standby resource activated and operation of the computer system with the standby resource inactivated. To this end, the system may determine a first result with the standby resource inactive. The system may additionally determine a second result with the standby resource active. The determination of the first and second results may be accomplished for a substantially concurrent period of operation. The first and second results are typically compared to determine the performance differential.

One aspect of the invention enables manual or automatic activation of standby resources. For instance, a user may be prompted to activate a standby resource in response to a detected large query. Standby resources may alternatively be dynamically activated in response to an automatic comparison between the first and second results.

The above and other objects and advantages of the present invention shall be made apparent from the accompanying drawings and the description thereof.

DETAILED DESCRIPTION

As mentioned above, the embodiments discussed hereinafter utilize a database engine and optimizer framework that optimize on demand resource usage. To this end, embodiments consistent with the invention may entice a user to activate additional processors in response to need. Where such activation translates into significant time savings, the system may run some queries or other tasks with on demand processes activated to prove that the estimates are good. In one embodiment consistent with the invention, the activation is accomplished free of charge to entice the user to activate resources in the future. A report may then be generated to show the user the benefits of the actual performance and to encourage the user to purchase on demand features. To promote such sales, a representative may further enable on demand resources for a period of time. Programming inherent to a system of another embodiment consistent with the invention may automatically detect a slow running query and dynamically prompt the user to activate on demand resources on a trial basis. User purchase options may include permanently enabling on demand processors, as well as allowing the optimizer to dynamically activate on demand processors as needed.

Figure 1:
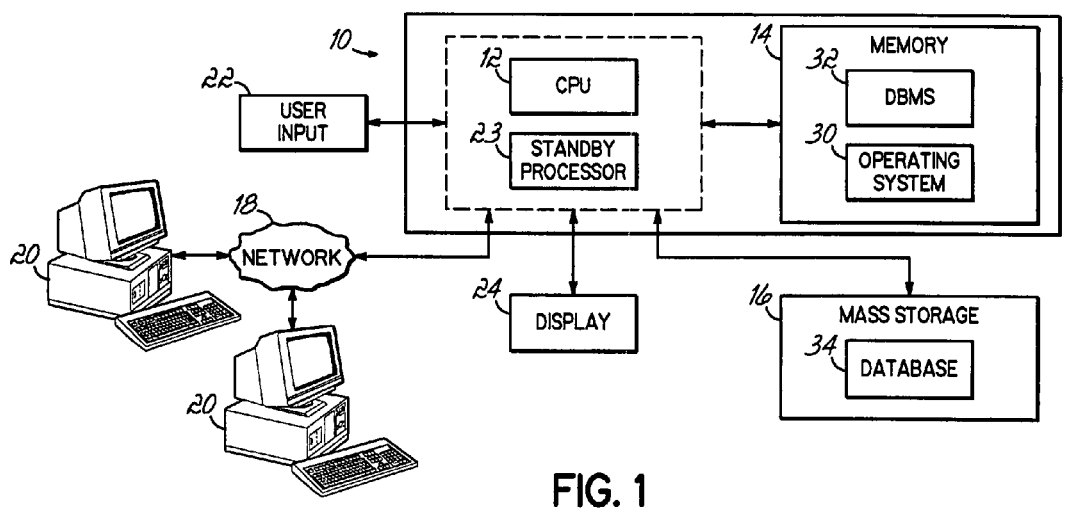
FIG. 1 is a block diagram of a networked computer system incorporating a database management system consistent with the invention.

Turning now to the Drawings, wherein like numbers denote like parts throughout the several views, FIG. 1 illustrates an exemplary hardware and software environment for an apparatus 10 suitable for managing resources within a capacity on demand computer system. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer" and/or "system," although it should be appreciated the term "apparatus" may also include other suitable programmable electronic devices consistent with the invention.

Computer 10 typically includes at least one processor, or (CPU) 12, coupled to a memory 14. Processor 12 may represent one or more processors (e.g., microprocessors), and memory 14 may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor 12, as well as any storage capacity used as a virtual memory, e.g., as stored on a mass storage device 16 or on another computer coupled to computer 10 via network 18 (e.g., a client computer 20).

As shown in FIG. 1, system processors may include standby processor(s) 23, in addition to other standby resources. When activated, a standby processor 23 may function within the computer 10 as any other processor 12. An additional type of standby resource that may be utilized in computer 10 in addition to or in lieu of standby processor 23 is an integrated computer, e.g., integrated card-based computers such as Integrated xSeries servers available from IBM. An Integrated xSeries server typically provides an Intel-based server on a PCI card and running a version of a Microsoft Windows operating system, which is capable of being plugged into a PCI slot in an IBM iSeries server to leverage the iSeries server's system management, communication and storage resources, while otherwise operating as a standalone Windows-based server. Other forms of integrated computers, whether or not card-based, may be used consistent with the invention.

As discussed herein, a suitable standby resource that is consistent with the principles of the present invention may include an allocatable component or function of a computing environment. As such, exemplary standby resources may include processors, direct access storage devices (DASD) or other memory, plugin cards, input/output controllers, adaptors or devices and other hardware devices, among other components. Standby resources may also comprise multiple such components, e.g., processor cards including multiple processors coupled to local memory and other components, e.g., for a NUMA-based architecture.

Computer 10 also typically receives a number of inputs and outputs for communicating information externally. For interface with a user or operator, computer 10 typically includes one or more user input devices 22 (e.g., a keyboard, a mouse, a trackball, a joystick, a touchpad, and/or a microphone, among others) and a display 24 (e.g., a CRT monitor, an LCD display panel, and/or a speaker, among others). Otherwise, user input may be received via another computer (e.g., a computer 20) interfaced with computer 10 over network 18, or via a dedicated workstation interface or the like.

For additional storage, computer 10 may also include one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, computer 10 may include an interface with one or more networks 18 (e.g., a LAN, a WAN, a wireless network, and/or the Internet, among others) to permit the communication of information with other computers coupled to the network. It should be appreciated that computer 10 typically includes suitable analog and/or digital interfaces between processor 12 and each of components 14, 16, 18, 22 and 24 as is well known in the art.

Computer 10 operates under the control of an operating system 30, and executes or otherwise relies upon various computer software applications, components, programs, objects, modules, data structures, etc. (e.g., database management system 32 and database 34, among others). Moreover, various applications, components, programs, objects, modules, etc. may also execute on one or more processors in another computer coupled to computer 10 via a network 18, e.g., in a distributed or client-server computing environment, whereby the processing required to implement the functions of a computer program may be allocated to multiple computers over a network.

Memory 14 includes a database management system (DBMS). The DBMS program is used to access information stored in databases in response to searches, or queries. Such databases are typically accessed using a standardized language such as Structured Query Language (SQL). The execution of the queries may be optimized, or conducted in an automated manner to minimize the amount of resources required to execute each query.

Figure 2:
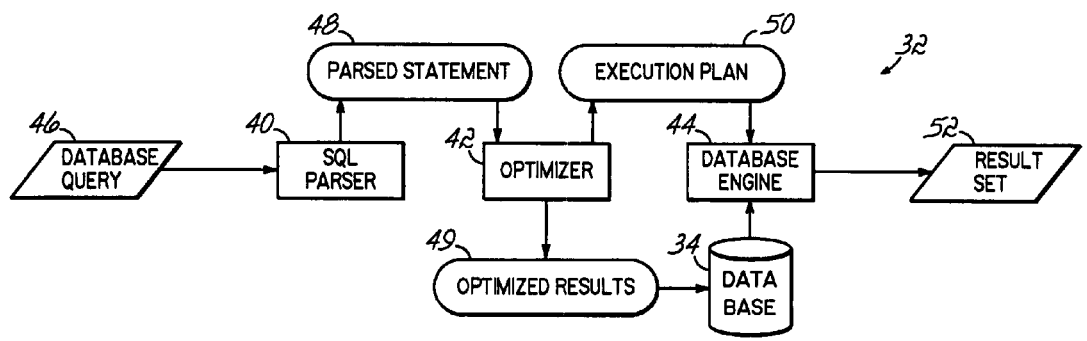
FIG. 2 is a block diagram illustrating the principal components and flow of information therebetween in the database management system of FIG. 1.

Turning briefly to FIG. 2, an exemplary implementation of a DBMS 32 is shown. The principal components of the DBMS 32 that are relevant to query optimization include SQL parser 40, cost-based optimizer 42 and database engine 44. SQL parser 40 receives from a user a database query 46, which in the illustrated embodiment is provided in the form of an SQL statement. SQL parser 40 then generates a parsed statement 48 therefrom, which is passed to optimizer 42 for query optimization. As a result of query optimization, optimized results 49 are generated. As discussed below in detail, such results may include results with both a standby resource 23 being active and for the standby resource being inactive. The optimized results 49 may be generated using data such as platform capabilities, query content information, etc., and may be stored in database 34. Once generated, DBMS 32 may use the results 49 to generate an execution plan 50. The execution plan 50 may be forwarded to database engine 44 for execution of the database query on the information in database 34. The result of the execution of the database query is typically stored in a result set, as represented at block 52.

Other components may be incorporated into DBMS 32, as may other suitable database management architectures. Other database programming and organizational architectures may also be used consistent with the invention. Therefore, the invention is not limited to the particular implementation discussed herein.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature.

Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIGS. 1 and 2 is not intended to limit the present invention. Indeed, those skilled in the art will recognize that other alternative hardware and/or software environments may be used without departing from the scope of the invention.

Figure 3:
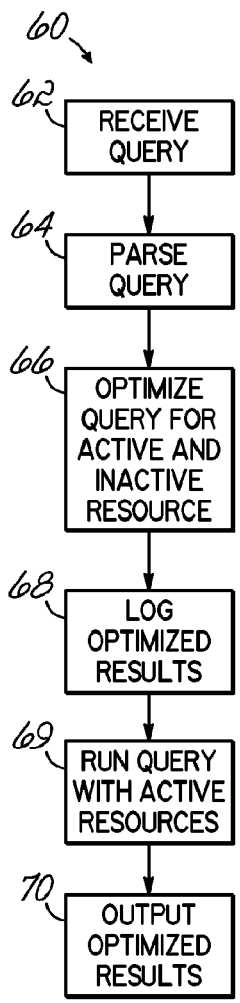
FIG. 3 is flowchart having a sequence of steps executable by the computer system of FIG. 1 to output results of optimized queries corresponding to active and inactive resource operation.

FIG. 3 illustrates a modification of the general flow depicted in FIG. 2. In particular, FIG. 3 illustrates a flowchart 60 having a sequence of steps executable by the computer system 10 of FIG. 1. More particularly, the steps of the flowchart 60 are configured to output results of optimized queries corresponding to active and inactive resource operation. In one sense, the system 10 outputs information useful in comparing efficiency and productivity factors as they relate to the selective activation of standby resources.

Turning more particularly to the steps of FIG. 3, the system 10 may receive a query at block 62. A query for purposes of the specification may include a computer task. Such a task may include a request to retrieve information from a database, e.g., sampling statistical sales information for a particular geographic region.

The computer system 10 may parse the query at block 64. Parsing processes may include functions used to read and execute the query. At block 66 of FIG. 3, the optimizer 42 may optimize the query. More particularly, the optimizer 42 optimizes the query for both a standby resource 23 being active and for the standby resource 23 being inactive. The optimizer 42 may accomplish the optimization processes by estimating performance factors and operation based on known optimizer algorithms. Such estimates may include determining cost by estimating the time required to run the query under each scenario. For example, a first estimate with the standby resource 23 active may be 13.1 minutes. A second estimate with the standby resource 23 inactive may be 45.2 minutes. The estimates may presume all other variables are equal, i.e., the system 10 performs each estimate under similar or the same conditions.

The system 10 may store the optimized query results at block 68, and run the query with active resources at block 69. The system 10 may then output the optimized results (or a summary of those results) to a user at block 70. Such results are typically output on a periodic basis, and may include a summary across all queries for a give period, e.g., each month. The system 10 may display the results via a graphic user interface on a display 24 visible to the user. In some instances, the optimized results may include estimated savings that may be realized as a result of activating one or more standby resources.

Figure 4:
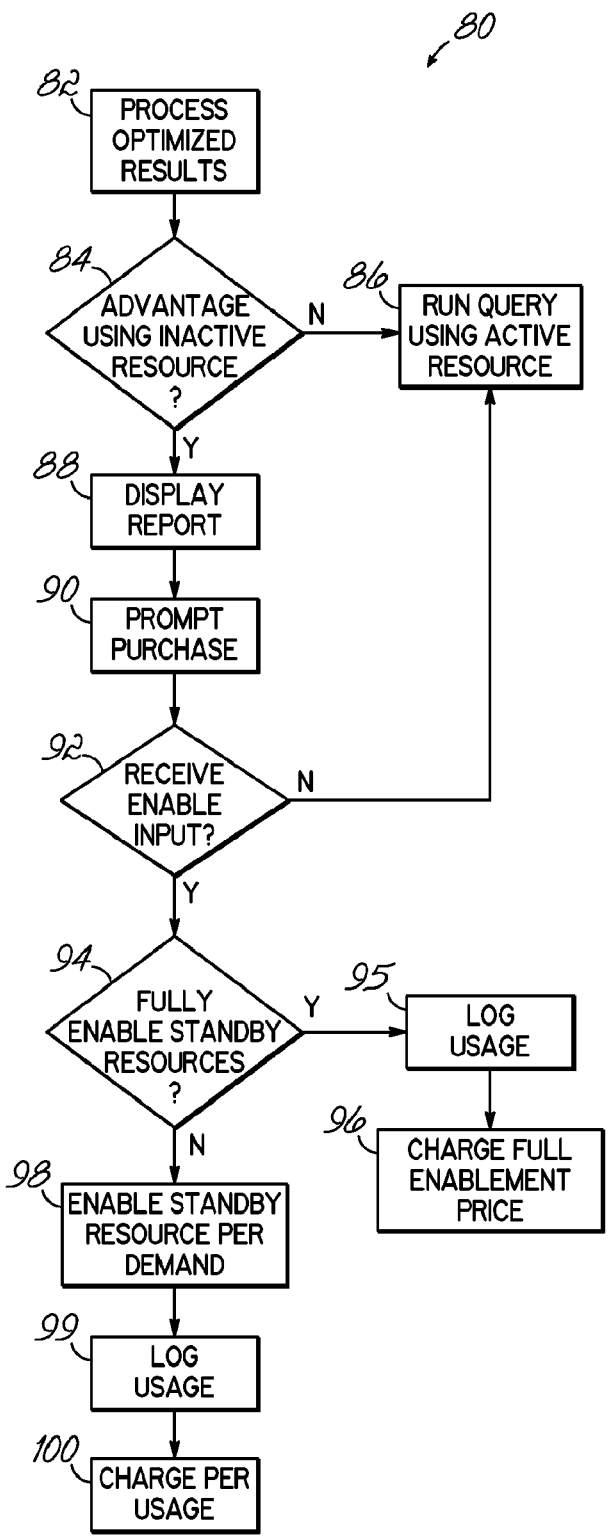
FIG. 4 is a flowchart having steps executable by the computer system of FIG. 1 for processing the query results of FIG. 3 to manage activation of standby resources.

FIG. 4 is a flowchart 80 having steps executable by the computer system 10 shown in FIG. 1 for processing the query results to manage activation of standby resources. Turning more particularly to FIG. 4, the system 10 processes the query results at block 82. As discussed herein, the query results may include optimized estimates of system productivity with a standby resource activated and inactivated.

The system may determine at block 84 of FIG. 4 whether there is an advantage to activating an inactive resource. To this end, the system 10 may compare the query results for when the standby resource 23 is activated to the query results for when the standby resource 23 is inactivated. While a sufficient advantage for purposes of block 84 may include any measure of superior efficiency, an advantage in another embodiment may include some threshold or elevated level of efficiency, e.g., twenty percent more efficient.

Should the computer system 10 determine at block 84 that there is no advantage to using an inactive resource, then the system 10 may run the query at block 86 using only the currently active resources. That is, the system 10 may not activate any standby resources 23 as a result of the evaluation at block 84.

The system 10 may alternatively display a report at block 88 where it is determined at block 84 that a processing advantage may be realized when activating a standby resource. The report displayed at block 88 may include a pop-up dialog box, an electronic notification, or other prompt at block 90 configured to prompt the purchase by the user of standby resources 23.

Where a user at block 92 chooses not to activate standby resources 23, then the query may be executed using currently active resources at block 86. Where the system 10 alternatively receives activating input from a user at block 92, then standby resources may be activated. For instance, a salesman may activate a standby processor 23 in response to receiving enabling input, e.g., an electronic email, from a user at block 92. In another embodiment, the system 10 automatically activates the standby processor 23 in response to receiving the enabling input from the user.

The prompt and/or input at blocks 90 and 92, respectively, may suggest or specify that all available standby resources 23 be activated at block 94. Where the resources 23 are activated, usage of the activated standby processors may be logged at block 95 for billing purposes. The user may be subsequently charged at block 96 for enablement of the standby resources. The standby resources may alternatively be activated on an on demand basis at block 98. The query optimizer may determine how many standby resources should be activated. In another embodiment, an administrator, salesman and/or a processor 12 may determine how many standby resources 23 should be activated. Usage of the standby resources activated at block 98 may be recorded at block 99, and the user may be charged for the activation at block 100.

Figure 5:
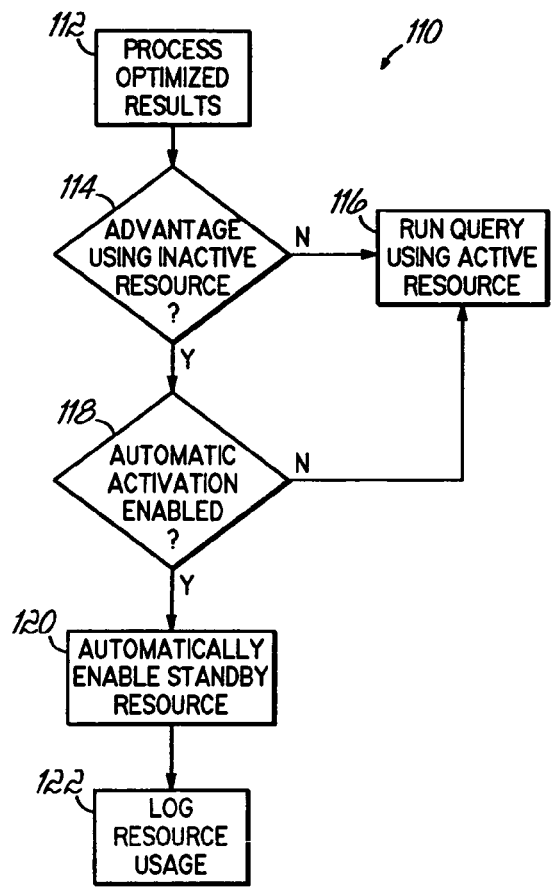
FIG. 5 is a flowchart having steps executable by the computer system of FIG. 1 for automatically activating standby resources in response to a determination that a sufficient advantage may be realized by activating one or more standby resources.

FIG. 5 is a flowchart 110 having steps executable by the system 10 of FIG. 1 for automatically activating standby resources 23. More specifically, the embodiment of FIG. 5 includes automatic activation of standby resources in response to a determination that a sufficient advantage may be realized by activating one or more standby resources. Turning more particularly to block 112 of FIG. 5, the system 10 processes the query results. The query results typically include optimized estimates of system productivity with a standby resource activated and inactivated.

The system may determine at block 114 of FIG. 5 whether there is an advantage to activating an inactive resource. To this end, the system 10 may compare the query results for when the standby resource 23 is activated to the query results 49 for when the standby resource 23 is inactivated.

Should the computer system 10 determine at block 114 that there is no advantage to using an inactive standby resource 23, then the system 10 may run the query at block 116 using only the currently active resources 12. That is, the system 10 may not activate any standby resources 23 as a result of the evaluation at block 114.

Should the computer system 10 alternatively determine at block 114 that there is an advantage to using an inactive standby resource 23, then the system 10 may determine at block 118 whether automatic activation is enabled. Where it is not at block 118, then the system 10 may execute the query at block 116 using only the already available resources 12. As such, no standby resources 23 may be activated in response to the query processed at block 112.

In response to confirming that the automatic activation feature is enabled at block 118, the system 10 may automatically enable one or more standby resources 23 at block 120. Activation of the standby resources at block 120 may be automatically accomplished by activating all or some of the standby resources 23, as determined by an administrator, program precept and/or a predetermined protocol. For instance, system 10 may execute a program used to activate standby resources 23 as the benefits of their activation are automatically determined, as in an on demand type scenario. Activation of the standby resource(s) may be logged at block 122 for billing and other accounting purposes.

Figure 6:
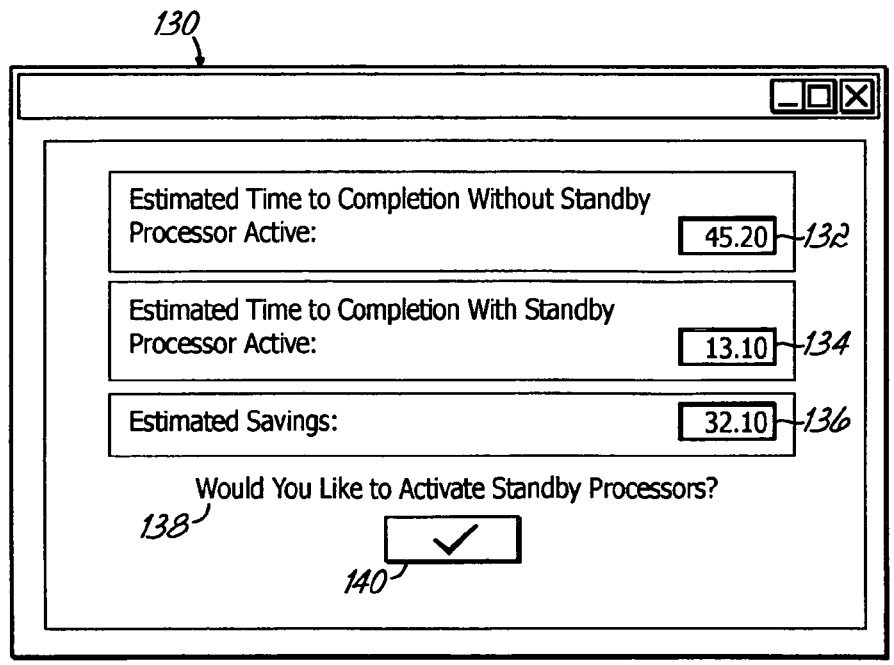
FIG. 6 shows an exemplary computer communication as may be presented on the display of FIG. 1 in the course of executing the processes of FIGS. 2-5.

FIG. 6 shows an exemplary computer communication 130 as may be presented on the display 24 of FIG. 1. More particularly, FIG. 6 shows a communication 130 that the system 10 of FIG. 1 may present to a user in the course of executing the processes of FIGS. 2-5. The communication 130 may include a dialog box or graphic user interface, for instance. The communication 130 is configured to communicate query results to a user. Displayed query results may include a time measurement indicative of how long it would take to complete the query without additional standby resources activated, as shown in field 132 of FIG. 6. Field 134 of the communication 130 may include a time measurement indicative of how long it would take to complete the query with additional standby resources activated. A differential indicative of the query results of fields 132 and 134 is shown in field 136 of FIG. 6. After reviewing the query results, a user may activate one or more standby resources 23 in response to the prompt 138 by selecting option 140 of FIG. 6.

While the present invention has been illustrated by a description of various embodiments and while these embodiments have been described in considerable detail, it is not the intention of the applicants to restrict, or in any way limit, the scope of the appended claims to such detail. For instance, any of the steps of the above exemplary flowcharts may be deleted, augmented, made to be simultaneous with another or be otherwise altered in accordance with the principles of the present invention. Furthermore, embodiments consistent with the invention have application within logically partitioned environments. A query optimizer within each partition may optimize queries based on processes within the partition, as well as on demand processor available to the partition, including those in an on demand pool. Additional advantages and modifications will readily appear to those skilled in the art. One skilled in the art will further appreciate that while the processes of the present invention may provide particular advantages within the context of query optimization, the principles of the invention further may apply to many other applications, to include optimizing use of standby resources to accomplish any computer task. Moreover, such optimization and reports as described herein may be reflective of actual or predicted performance using (and/or not using) standby resources. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method of managing resources within a computer system having a selectively activated standby resource, the method comprising:
   determining information indicative of a performance differential between operation of the computer system executing a task with the standby resource activated and operation of the computer system executing the task with the standby resource inactivated, wherein the information is determined prior to execution of the task; and
   outputting the information.

2. The method of claim 1, wherein determining the information further includes determining a first result for executing the task with the standby resource inactivated.

3. The method of claim 2, wherein determining the information further includes determining a second result for executing the task with the standby resource activated.

4. The method of claim 3, wherein determining the information further includes determining the first and second results during a substantially concurrent period of operation.

5. The method of claim 3, wherein determining the information further includes comparing the first and second results.

6. The method of claim 1, further comprising activating the standby resource in response to the information.

7. The method of claim 6, wherein activating the standby resource further includes automatically activating the standby resource in response to the information.

8. The method of claim 6, wherein activating the standby resource further includes prompting a user to activate the standby resource.

9. The method of claim 1, wherein the computer system is a capacity on demand computer system, and wherein the standby resource is configured to be activated for a fee, and wherein outputting the information includes outputting the information to a user of the capacity on demand computer system to encourage the user to activate the standby resource during execution of the task and incur a fee associated with activation of the standby resource.

10. A method of rendering invoices for providing dynamically allocated resources based on resource activation, the method comprising:

determining a performance differential between operation of a capacity on demand computer system with a standby resource activated and operation of the capacity on demand computer system with the standby resource inactivated, wherein the standby resource is of the type that is configured to be activated for a fee; and providing the performance differential to a user of the capacity on demand computer system to encourage the user to activate the standby resource and incur a fee associated with activation of the standby resource.

11. The method of claim 10, further comprising enticing the user to enable the standby resource.

12. The method of claim 10, further comprising enabling the user to activate the standby resource.

13. The method of claim 12, further comprising billing the user according to the activation of the standby resource.

14. A method of managing resources within a capacity on demand computer system having a standby resource that is activated for a fee, the method comprising:

determining a first performance result for executing a task while the standby resource is inactive;

determining a second performance result for executing the task while the standby resource is active;

comparing the first and second performance results; and in response to comparing the first and second performance results, outputting information indicative of the comparison to encourage a user to activate the standby resource to execute the task and incur a fee associated with activation of the standby resource.

* * * * *